Oct. 31, 1933.  W. KURZE  1,932,701
PHOTOGRAPHIC APPARATUS
Filed Jan. 25, 1930  2 Sheets-Sheet 1
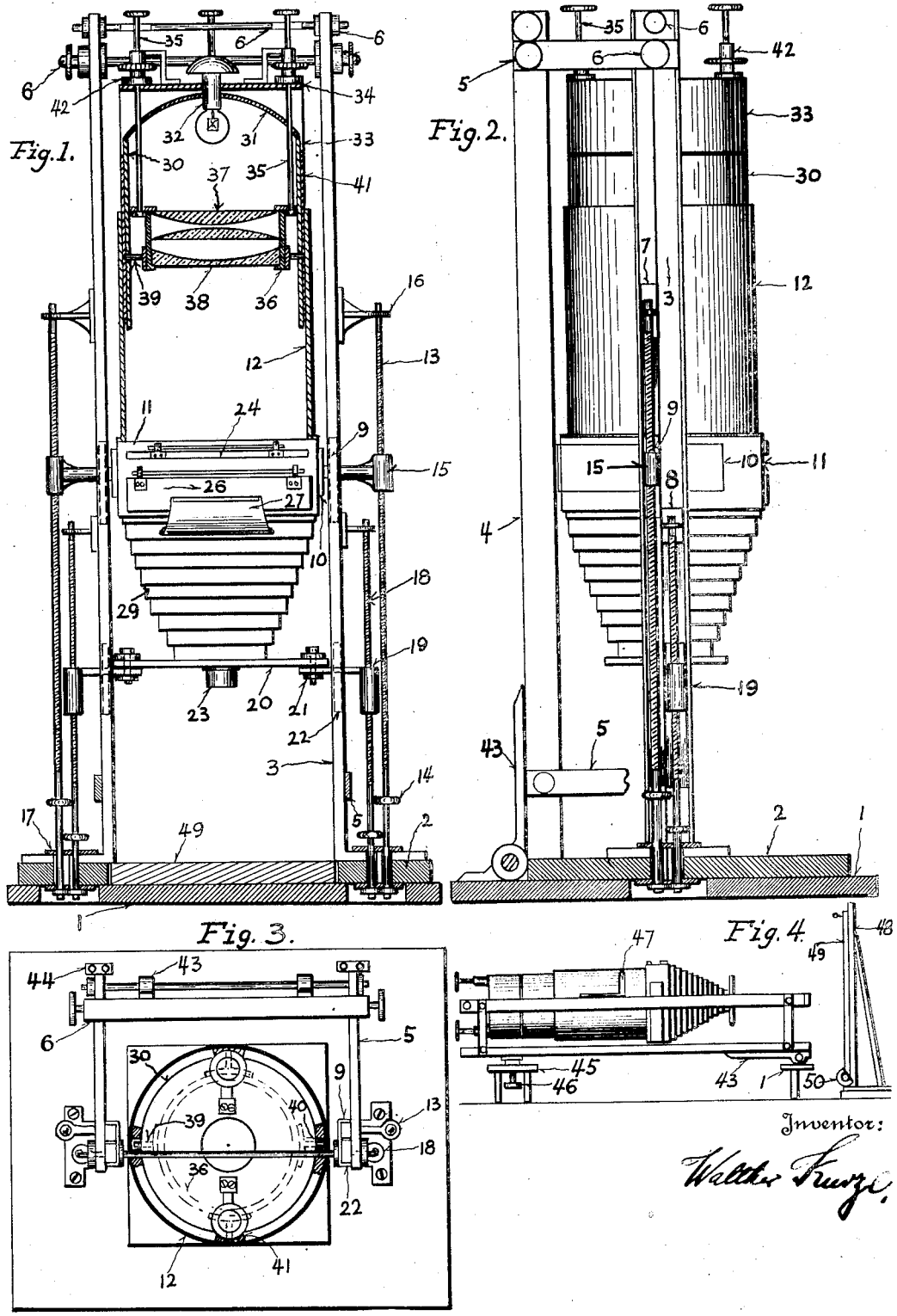

Oct. 31, 1933.    W. KURZE    1,932,701
PHOTOGRAPHIC APPARATUS
Filed Jan. 25, 1930    2 Sheets-Sheet 2
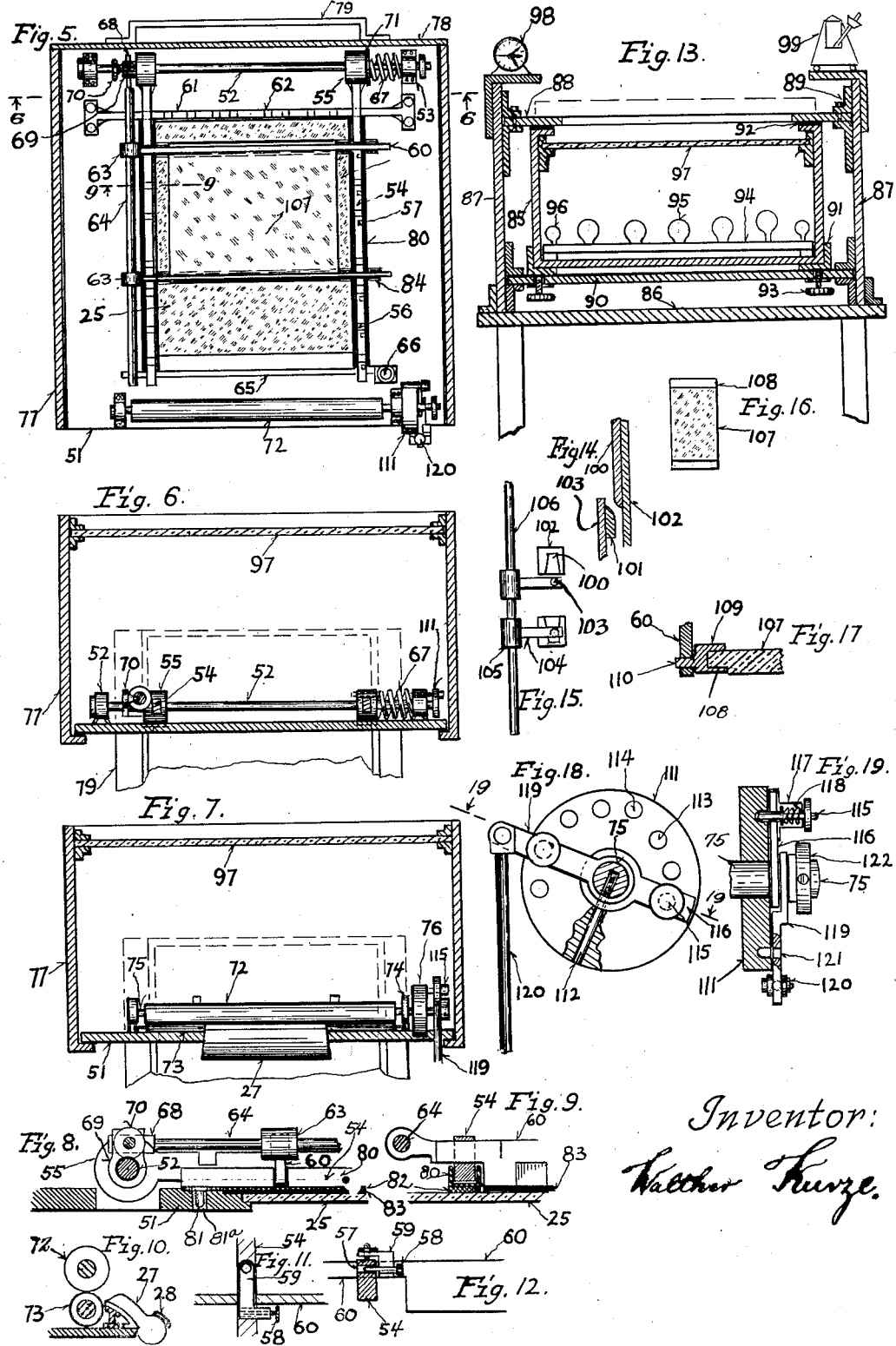

Patented Oct. 31, 1933

1,932,701

UNITED STATES PATENT OFFICE 1,932,701

PHOTOGRAPHIC APPARATUS

Walther Kurze, New Athens, Ill.

Application January 25, 1930. Serial No. 423,478

1 Claim. (Cl. 88—24)

My invention relates generally to photography and the improvements are directed to a novel form of apparatus designed for photographic printing and enlarging from negatives and combines in one apparatus all special apparatus hitherto necessary thereto.

At the present time it is customary to produce photographic prints and enlargements from negatives through the application of various special apparatuses which moreover differ considerably in size.

In order to overcome objectionable features of this kind the primary object of my invention is to provide an apparatus which combines all special apparatuses in one and renders it possible to print as well the smallest photographs as also the largest not only in the same size of the film, but to print simultaneously in the same production time also the largest enlargements. Moreover, only one workman is necessary to operate the combined printer and enlarger up to and including enlargements in sizes 24 x 30 inches—beyond that, two workmen—an advantage that has until now not even been approximately attained by any invention lying in this field, accordingly simplifying significantly the production of enlargements as well as the usual prints.

A more specific object toward simplification in the method of production is attained by using a single film or paper guide for the films as well as for the photographic paper, the function of the film or paper guide remaining the same immaterial if the combined printer and enlarger is in a vertical or horizontal position. Furthermore, the film or paper guide can be entirely removed from the combined printer and enlarger and be used to function upon a lighting arrangement (which can be delivered along with the combined printer and enlarger), as a simple printer, without enlargements, while the combined printer and enlarger on the other hand illuminates the photographic paper on the easel. One and the same film or paper guide can accordingly be used in similar functioning precision as well for films as for paper; besides that, on the light arrangement for printing and on the easel, thus at four different places, as against four different special apparatuses as they are in use today.

A further novel feature is introduced by my invention in that in the process of printing the kodak films need not be severed. Similarly, in making simple prints of kodak films my invention is so constructed that the print paper glides through the film or paper guide in roll form, so that single sheets find application only for single prints and cut kodak films.

Hitherto the condensing lenses were used above all for the purpose of increasing the light effects. My invention shows, as hereinafter described, an entirely new lens arrangement. The hitherto lens arrangement, theoretically considered, develops parallel lines which produce a harder effect. In my invention the rays are broken irregularly through reflections, at the same time however condensed in such a manner that they penetrate the negative with a resulting greater fineness and number of rays, consequently fashioning the picture much softer. This lighting arrangement moreover distinguishes itself particularly, in the case of the largest enlargements of portraits and sceneries, through a hitherto unattained reproduction through focusing of the illumination lenses, and in the case of technical photographs through a decidedly accurate image sharpness. In the case of smaller portrait pictures the illumination lenses need not be used, because with my invention the large light effects, produced through glass and brilliant reflections, already attain so high an illumination that strong filters must be used.

My invention further distinguishes itself, in that all parts are adjusted, and despite the many functions, the only instrument necessary for setting together and taking apart the combined printer and enlarger is a single screwdriver, and for adjusting, nothing further than a right angle with level. All remaining parts are moved by hand. The entire erection accordingly shows greatest simplicity combined with precise functioning, insuring finest reproduction of portraits, sceneries and technical subjects.

It will thus be seen from the objects and advantages of my combined printer and enlarger as above and hereinafter described and as represented by the accompanying drawings, that my invention contains many novelties in its construction, in the simplification of the arrangements for the production of photographic products, and in the combination of the effects, as defined in the patent claim, and illustrated in the drawings.

In said drawings:

Figure 1 is a front elevation of the combined printer and enlarger in a vertical position, with parts in section.

Fig. 2 is a side elevation of the same, partly in section.

Fig. 3 is a top plan view.

Fig. 4 is an elevation of the combined printer and enlarger in a horizontal position.

Fig. 5 is a horizontal sectional view of the film case.

Fig. 6 is a transverse sectional view of the film case of the combined printer and enlarger taken on the line 6—6 of Fig. 5.

Fig. 7 is a similar sectional view of the front portion of the film case.

Fig. 8 is an enlarged sectional side view of the lengthwise rails of the film or paper guide, taken through the plate 51 and shaft 52.

Fig. 9 is a sectional view of the crosswise rails, taken on line 9—9 of Fig. 5.

Fig. 10 represents a sectional detail of the introducer for kodak serial films.

Figs. 11 and 12 show the safety locking means between the lengthwise and crosswise rails.

Fig. 13 shows the application of the film or paper guide as simple printing plate above light case in cross section.

Figs. 14 and 15 represent automatic light contacts.

Fig. 16 shows a reduced inverted plan view of the glass plate, for pressing of the films and the photo paper during the production of the picture with the crosswise holders.

Fig. 17 is a sectional detail of the glass plate introduced in one of the crosswise rails.

Fig. 18 is a side view of the regulating device for the different sizes of the films and the paper by kodak serial films.

Fig. 19 is a cross sectional view thereof taken on line 19—19 of Fig. 18.

Referring now in detail to the accompanying drawings let the numeral 1 indicate the table and 2 the plates to which are attached the guide rails 3 and the rear vertical supports 4; both being secured by means of the lateral connections 5 and the crosswise connections 6. The guide rails 3 are of a U-form in cross-section, each guide rail being provided with two notches 7 and 8 in order to permit of the apparatus being moved up and down. The upper larger notch 7 serves to guide the slide rails 9 which are firmly bound by means of the film case holder 10 and the latter is firmly bound with the film case 11, upon which the guide casing 12 is screwed, which may be circular or rectangular in cross-section. The movement results through the spindles 13, which are moved by means of the hand wheels 14. Upon the spindles 13 slide the guide cylinders 15, which move the film case 11 and the large guide casing for light arrangement 12. These spindles 13 are guided on top by means of the upper holders 16, below in the cylindrical guide pieces 17. These spindles 13 with their lower portion are so connected with the cylindrical guide pieces 17, so that they can rotate without rising up and down.

The smaller spindle 18 operates the same as spindle 13, the difference consisting only therein that the guide cylinder 19 is connected to the crosswise connection 20 through the binding screws 21; the slide rails 22 guide the crosswise connection 20 with the enlargement lens 23 in the same manner as the slide rails 9 the film case 11.

The focusings of the enlargements results firstly through the focusing of the distance of the film case 11, the finer focusing through the movement of the crosswise connection 20. On the top of the film case 11 is a lid 24, which closes the slit for introduction of the opal glass plate 97 (see Figs. 6 and 7). Thereunder is a larger lid 26 which closes the aperture for introduction of the film guide. (See details and description in Figs. 5 to 19, inclusive.) The lid 26 shows moreover the introducer 27 which serves to introduce the kodak serial film. This introducer 27 (see Fig. 10) is formed into a closed cylinder which is provided with a lid 28 for opening for the purpose of laying in films or paper rolls, and also provided with a slit for their passage through. On the lower end of the film case 11 is fastened the bellows 29, and on the upper end is screwed on the guide casing 12.

In the upper part of the guide casing 12 is positioned the illumination arrangement. This consists of the illumination cylinder 30, the upper end of which is closed by means of the reflector 31. The reflector 31 is perforated in the middle for reception of the illumination 32. Besides that it is provided with many small perforations, which serve as ventilation. The cylinder 33 is closed on top by means of the cover lid 34. The reflector 31 is further provided with four diametrical perforations, for the reception of the four regulating spindles 35, which are firmly secured with the lens holders 36. The lens holders 36 are adapted to receive the lenses 37, and the lens 38, which diffuse the rays. The lens holder 36 has at its lower portion four diametrical guide bolts 39 which are guided in illumination cylinder 30 (see Fig. 3) by means of four diametrical slits 40. On the outside of the illumination cylinder 30 are attached four guide rails 41, in whose slits glide the four diametrical guide bolts 39. Above the cylinder 33 and on the cover lid 34 are arranged the four spindle guides 42, which serve to move the lens holders 36.

Figs. 2, 3 and 4 represent the large hinge 43 which is screwed upon the table 1 by means of the hinge holders 44. The hinge 43 serves to lay over or erect the apparatus in horizontal or vertical position. In Fig. 4 with the laying over of the apparatus is to be seen a second table 45 which is provided with a spindle arrangement 46 adapted to adjust the apparatus. The adjusting for the purpose of effecting a parallelization between film and photo paper is accomplished by means of a right angle with level 47, which is set up at different places, also on easel 48. In front of the apparatus is positioned the easel 48 on the front of which is attached the paper guide 49 by means of the hinge 50.

The insertion of films and photo papers is accomplished by means of an exchangeable special arrangement, described as follows:

On the plate 51 (see Figs. 5, 7 and 8) the cylindrical shaft 52 is stationed in the bearing holders 53. On the cylindrical shaft 52 move the guide rails 54 with their guide cylinders 55, the guide rails being laterally focused according to the size of the film or paper. These guide rails 54 are provided in the crosswise direction with rectangular notches 56. In addition, on the right side, with cylindrical perforations 57 for reception of the safety bolts 58, which are situated in the lateral revolving safety locks 59. These safety locks 59 can, according to the size of the construction, be fastened to the crosswise rails 60. On the rear side of the plate 51 is screwed the stationary crosswise rail 61; which likewise is provided with rectangular notches 56, which serve for putting in of the negative or the paper. The visible portions of the guide rails 54, 60 and 61 are provided with numbers of the different sizes of paper and films. The crosswise rails 60 are revolvingly situated with their cylindrical bearings 63 upon the shaft 64 which is bound at its fore end with the lengthwise rails 54 by means of the crosswise connection 65 which on one side possesses the foot pedal 66 for opening and closing of the apparatus. Its automatic opening results through the spiral spring 67. The shaft 64 is firmly bound through a rectangular connection piece 68 with a cylindrical extension 69, with the left guide cylinder 54 through the connection screw 70. The spiral spring 67 finds its boundary through the boundary disc 71 which is firmly fastened with the cylindrical shaft 52. The two glass plate bearings are described in the following in the description of the various parts.

Upon the plate 51 is positioned the introducer 27 of the kodak serial films or the paper rolls. On the fore side of the apparatus for introducing the kodak serial films or the paper rolls is screwed tight the film introducer 27 for films which in case of non-use can be easily removed. The film introducer 27 consists of the larger rubber roller 72 and the smaller rubber roller 73, both of which are situated above each other in the bearing holders 74. Upon the upper cylindrical shaft 75 is fastened the regulating arrangement 76 for regulating of the lengths by different films. This arrangement is specially described in Figs. 18 and 19.

The plate 51 is guided in the side walls 77 and limited in the back by the wall 78. The rear wall 78 supports the case 79 which is adapted for reception of the kodak serial films and the paper rolls.

The individual connections and securings will now be described. Fig. 8 shows a side view of the left guide rail 54, with its cylindrical shaft 52 and its guide cylinder 55. The upper side shows the shaft 64 with the rectangular connection piece 68 which is drawn through the cylindrical extension 69 and secured through the connection screw 70. Upon the shaft 64 slide the cylindrical bearings 63. On the under side is shown the cross section of the crosswise rail 60, which interlocks with the guide rail 80 which is firmly set in the plate 51. These fixed rails 80 serve the object of arresting the movable guide rails 54. The fixed rails 80 have the object, (a) to guide the movable guide rails in an adjusted condition, (b) to insert, adjusted, the films and paper, and (c) during the printing process to hold the films and paper in place. These rails 80 have at both ends cylindrical extensions with guide pins 81 which in connection with the putting in of different sizes of film and paper are set in adjusted perforations 81a, according to the size of the film or paper, in the plate 51. On their lower surfaces the guide rails 80 have rubber strips 82, as well for holding fast the negatives 83 as to serve as elastic means for protection of the glass plate 25. The regulating results so that the negatives and paper can be held fast or only loosely laid in.

Fig. 9 shows the shaft 64 in cross section with the crosswise rail 60 and the guide rail 54. On the lower side is shown the glass plate 25, upon this to the right the negative 83 and to the left the firmly standing guide rail 80 with the rubber strip 82. The Fig. 9 shows the U-form of the guide rail 80, which is made of aluminum. The immovable guide rails 84 for the crosswise rails 60 are similar in system. By kodak serial films the immovable or fixed guide rails of crosswise rails are withdrawn in order to permit passage of the together hanging films which through the film introducer 27 are regulated in the correct distance.

Fig. 10 shows the film or paper introducer 27 in cross section. Above is shown the large rubber roll 72, and below the smaller rubber roll 73; besides this the introducer 27 is provided with the lid 28.

In order to insure the regulated negative or paper apparatus in its adjusted position locks are necessary for the crosswise rails 60. Fig. 11 shows the locking means in plan, Fig. 12 from the side. The right guide rails 54 have a row of openings 57, (see Fig. 5), which serve for the reception of the locking means 58, which are attached to the swinging safety locks 59 on the right guide rail 54.

Fig. 13 shows in cross-sectional view the application of the guide apparatus for negatives and prints, a simple print apparatus upon an illumination case 85. Upon a table 86 are the two side walls 87 to which are secured the crosswise pieces 88 by means of the guide angle 89. Under the illumination case 85 is the plate 90 which carries the two movable guide rails 91. In order to make the illumination case 85 light proof it is provided all around at the upper end with rubber strips 92, which are pressed against the crosswise pieces 88 by means of regulating screws 93. In the illumination case 85 is inserted the illumination plate 94 with the white bulb 95 and the red or yellow bulbs 96. Toward the top the illumination case 85 is closed by means of the opal glass plate 97. The apparatus is also provided with a second-watch 98 and a metronome 99.

Figs. 14 and 15 represent the electric contacts 100 and 101, which are fastened on the fixed contact 102 and the movable contact 103. These movable contacts 103 are connected with lever arms 105 which are firmly fastened with the foot-pedal 106, so that by upward and downward movement the illumination is turned off or on in the simplest way possible.

In order to be able to use the apparatus alternately for negatives or paper the transparency which is necessary can only be accomplished by means of a bottom of glass. This glass plate 25 is shown in Fig. 5. In order to hold the film or the paper pressed flat is necessary a laid-on plate 107, which is not necessary for photo glass plates, seen from above in Fig. 5 and Fig. 16, and seen from the side in Fig. 17. The plate 107 is ground down at the sides on the lower surface, as shown at 108 for insertion into the supporting rails 109, these supporting rails 109 being provided with projections 110 to be set in slits in the crosswise rails 60.

Figs. 18 and 19 represent the regulating arrangement for kodak serial films and for photo printing paper in rolls; Fig. 18 shows a cross-sectional side view, Fig. 19 a cross-sectional front view, shown in Figs. 5 and 7. Upon the cylindrical shaft 75 is fastened the regulating-disk 111, by means of the bolt 112. The regulating-disk 111 is provided at two different distances from the middle point with cylindrical borings 113 and 114. The boring 113 serves for reception of the regulating-pivot 115 which is fastened to the small regulating-lever 116, upon which is screwed fast a cylindrical case 117 which serves for reception of the spiral spring 118, which is bounded on the outside by means of the lid of the case 117, on the inside by means of a cylindrical disk on the regulating pivot 115. The boring 114 serves for regulating of the large regulating lever 119 which on its exterior end is connected with the foot-pedal 120. Toward the inside the regulating lever 119 is perforated at 121, for the reception of a regulating pivot similar to 115. The connection disk 122 connects all aforementioned parts. The regulating disk 111 may be operated by hand in the case of defective serial photographs. Then the film is simply regulated by hand by means of the turning of the connection disk 122, after the two regulating pivots 115 have been removed from the selected openings.

The operation of the apparatus is as follows:

Upon the table 1 stands the apparatus, before it sits the operator (see Figs. 1 and 2) who lays in the negative in the film case 11. The guide apparatus (Fig. 5) is then regulated according to the size of the film, the crosswise rails 60 being thrown back, and also the guide rails 54. Then first of all the fixed guide rails 80 and 84 (see Figs. 8 and 9) are set on the plate 51. After this has been done, the movable guide rails 54 and 60 are adjusted and the glass plate 107 is set in the crosswise rails. Then the lengthwise and crosswise rails are secured by means of the safety locks 58 and 59 (see Figs. 11 and 12). If a plate-negative is used then the glass plate 107 is not required. Should the glass plate 107 be used then both crosswise guides are set upright, the glass plate corresponding to the size of the negative or paper is set in (Figs. 5 and 17). Then the foot-pedal 66 is connected (Fig. 5). The guide rails 54 then move upward and downward on the cylindrical shaft 52. Then the guide apparatus is all set and ready to be fitted into the film case 11 and after the lid 26 is opened. If serial films are used then the automatic film guide apparatus is applied and the regulating levers 116 and 119 regulated. The lower guide for paper must in the case of enlargements naturally be regulated larger according to the required size. All guide rails are provided with scales which show the different sizes and guarantee through their precision the adjusting. Also the guide rails for regulating the film case and the lens are provided with these scales.

In setting the combined printer and enlarger, the film distance is regulated by means of the large spindles 13, and the lens 23 through the small spindles 18. When the negative is faultless, it is not necessary for the operator to test the regulating for sharpness, as the apparatus is adjusted in every position, a good apparatus for scientific purposes being adjusted to the tenth of a millimeter. In the case of perfect negatives the picture is reproduced so exactly upon the paper that it need not be cut, excepting in the case of kodak serial films. One of the novelties in connection with this regulation is, that I can enlarge a negative from 2½ x 2½ inches to 20 x 24 inches and reduce a negative from 20 x 24 inches to 2½ x 2½ inches.

The illumination is regulated by means of the regulating spindles 35.

If the apparatus is used first of all for individual negatives, then the film introducer for serial films remains out of function. If kodak serial films are to be used, then the operator pulls out the regulating pivots 115 and regulates them at hand of the scales upon the required sizes of the negatives and the enlargements.

The operator has three pedals to operate, namely, (a) the pedal for opening and closing of the guide apparatus for negatives in the case of kodak serial films, which at the same time automatically turns the lights off and on; (b) the pedal for automatically opening and closing of the guide apparatus for individual negatives; and (c) the pedal for opening and closing of the guide apparatus for paper, immaterial if single or in rolls. The operator has thus both hands free when making the enlargements and prints. With the regulation of the printing paper in rolls, the same is automatically marked, so that it can then be cut at the right place.

In case of an unusual amount of work the regulating apparatus for the paper can be used as print apparatus, while the paper for enlargements on the combined printer and enlarger can be served by hand.

In general the apparatus will be used for enlargements up to 20 x 24 inches. Should larger enlargements be required, the apparatus can be removed from the table and placed on two high stands, so that the enlargement can be simply thrown upon a large board fastened at the easel. In general the apparatus will naturally be used vertically. For larger enlargements, the apparatus will naturally be tipped over and the negatives enlarged at the easel.

The apparatus moreover possesses the great advantage, that also the smallest negatives can be printed quicker, at once in double size, in post card size, or all larger sizes, than the hitherto usual copies from negatives.

I claim:

In a photographic printing apparatus, a support, means for mounting a light source thereon, a cylinder surrounding said light source, condensing lenses adjustably mounted in front of said light source, means for adjusting said lenses, a negative film holder mounted on said support in front of said condensing lenses, said negative holder comprising a removable film guide, movable guide rails adjustably positioned within said guide and fixed rails associated with said guide rails for guiding the same in an adjusted position, and a lens in front of said negative holder for projecting an image onto a sensitized sheet carried by said support.

WALTHER KURZE.